May 20, 1941.  W. H. CRONK  2,243,002
FLUSH TANK VALVE
Filed June 8, 1939  2 Sheets-Sheet 1
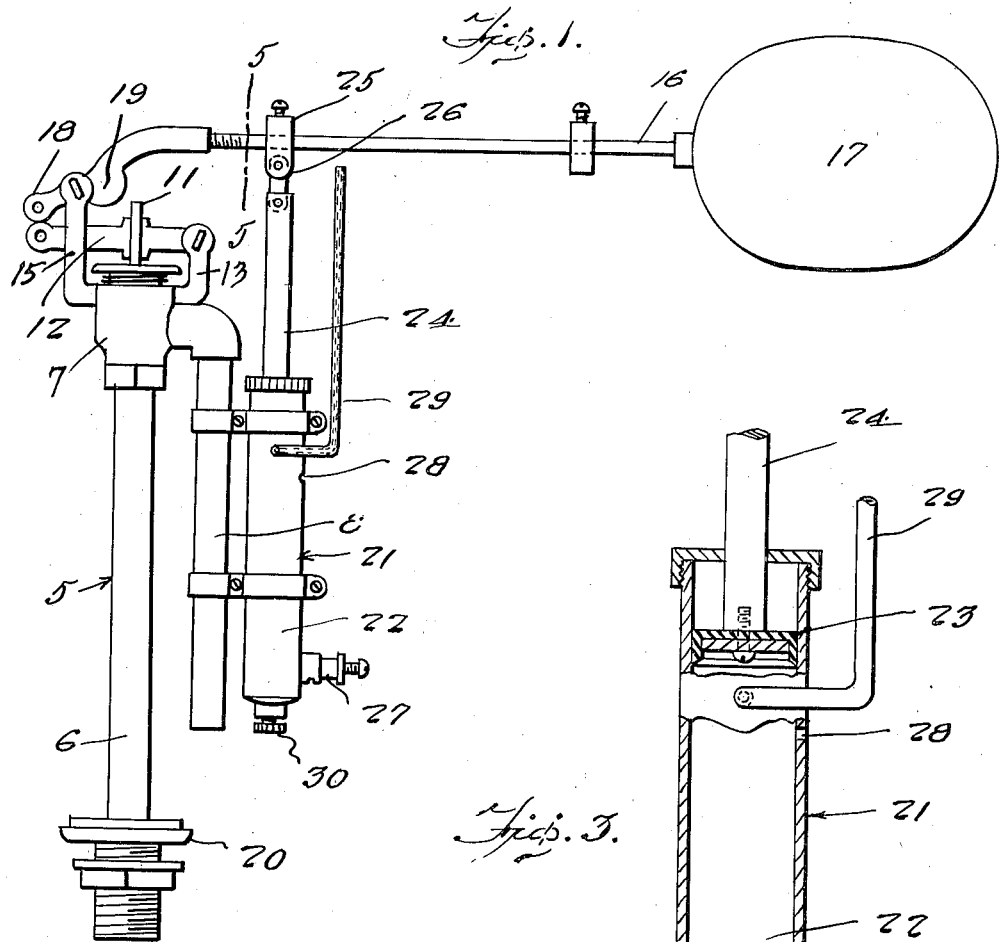
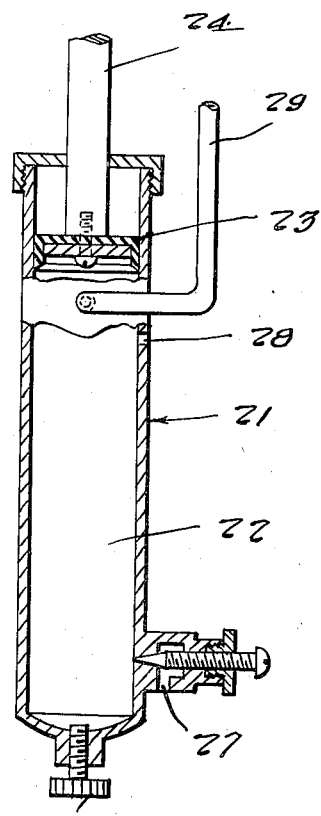
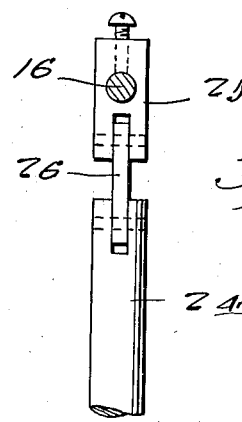
Inventor
W. H. Cronk
By Clarence A. O'Brien
and Hyman Berman
Attorneys May 20, 1941.  W. H. CRONK  2,243,002

FLUSH TANK VALVE

Filed June 8, 1939  2 Sheets-Sheet 2

Inventor
W. H. Cronk

By Clarence A. O'Brien
and Hyman Berman
Attorneys

Patented May 20, 1941

2,243,002

UNITED STATES PATENT OFFICE 2,243,002

FLUSH TANK VALVE

Walter H. Cronk, Canastota, N. Y.

Application June 8, 1939, Serial No. 278,157

2 Claims. (Cl. 137—104)

This invention relates to a flush tank valve, and has for the primary object the provision of a device of this character which besides closing the flow of water after the filling of the flush tank, will also automatically close said valve should the drain or ball valve of the flush tank fail to shut off after a flushing operation to prevent waste of water and includes a check means for governing the descent of the float to permit the tank to empty and partly fill under normal operation whereby the automatic closing of the valve will be prevented and only permitted to take place when the ball or drain valve fails to close.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a flush tank valve constructed in accordance with my invention.

Figure 3 is a fragmentary vertical sectional view illustrating the check means.

Figure 5 is a detail sectional view taken on the line 5—5 of Figure 1.

Figure 2:
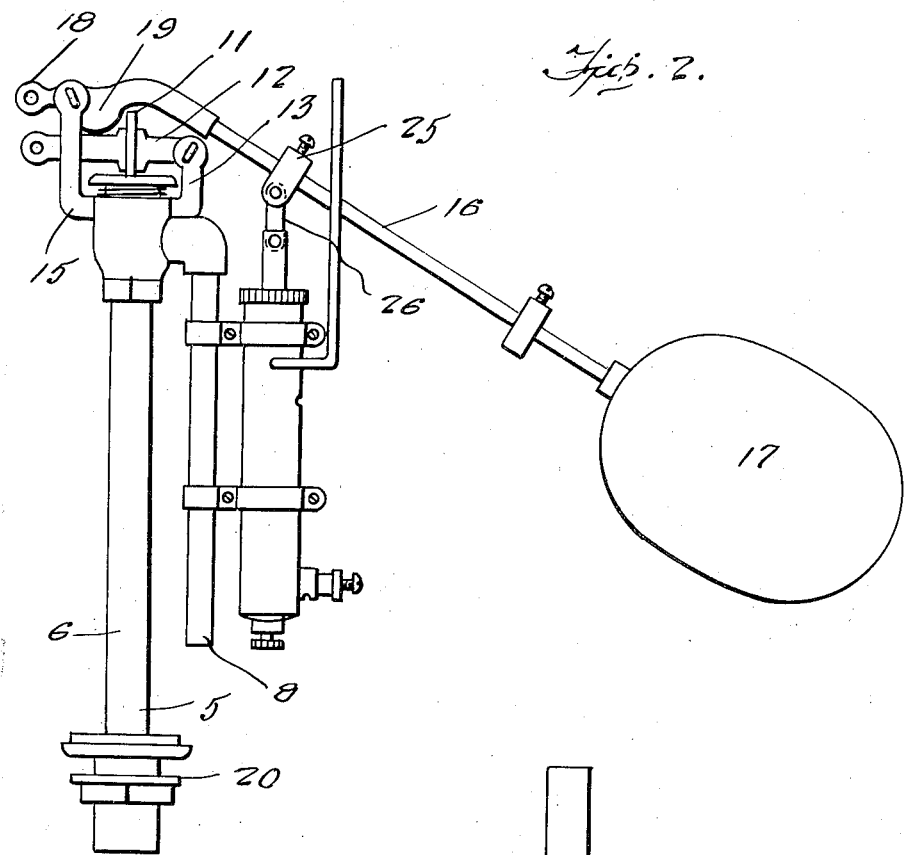
Figure 2 is a view similar to Figure 1 showing the float in its lowermost position and automatically cutting off the flow of water from the valve to the tank.
Figure 4:
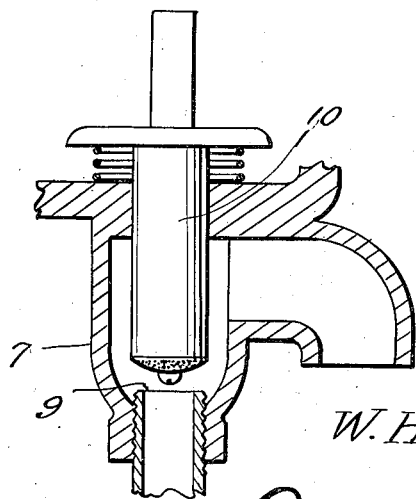
Figure 4 is a fragmentary vertical sectional view illustrating the valve element of the flush tank valve.

Referring in detail to the drawings, the numeral 5 indicates a flush tank valve consisting of the water inlet pipe 6, valve housing 7 connected thereto and including a water outlet pipe 8. The valve housing 7 includes a valve seat 9 having coacting therewith a valve element 10. The valve element is adapted to be unseated by pressure of water in the inlet pipe and carries at its upper end a slotted member 11 through which a valve element operating lever 12 extends. The lever 12 is pivotally mounted on a bracket 13 carried by the valve housing 7. The valve housing 7 also carries a bracket 15 to which a float arm 16 is pivoted. A float 17 is connected with the float arm 16 and the latter has a weight adjustably mounted thereon. An extension 18 is formed on the pivoted end of the float arm 16 to engage with the lever 12 and bring about closing of the valve element 10 when the float is in its uppermost position. An enlargement 19 is formed on the float arm 16 adjacent the pivot to engage the lever 12 and bring about closing of the valve element 10 when the float 17 is in its lowermost position.

Thus it will be seen that the valve element 10 will be closed when the float element is either in its uppermost position or in its lowermost position.

The inlet pipe 6 is provided with the usual fittings 20 for adapting the valve 5 to a flush tank (not shown).

A dashpot mechanism 21 is carried by the outlet pipe 8 and operatively connected to the float arm 16 for the purpose of checking the descent of the float 17 when the flush tank is flushed in the usual manner. However, the dashpot mechanism 21 is of such a construction that it will permit the float to descend rapidly from its uppermost position for a limited distance and then allow the float to gradually descend until in its lowermost position.

The dashpot mechanism 21 consists of a cylinder 22 having a piston 23 slidable therein. The stem 24 of the piston is connected to a collar 25 adjustably mounted on the float arm through a pivotal link 26. The cylinder 22 adjacent its lower end is provided with a needle type valve 27 whereby the inflow of fluid into the cylinder 22 may be governed as well as the outflow. The cylinder adjacent its upper end is provided with a port 28 which will allow fluid to escape rapidly from the cylinder until the piston passes said port. The cylinder adjacent the port 28 and slightly above the latter has connected thereto a vent pipe 29, the upper end of which is adapted to terminate above the surface of the water in the flush tank when the latter is full. The vent pipe 29 will permit air to escape from the cylinder 22 when fluid is entering said cylinder by way of the port 28 from the flush tank.

The bottom wall of the cylinder 22 is provided with a cleanout plug 30.

In operation, the valve 5 as shown in Figure 1, is acting to close the supply of water to the flush tank. When the flush tank is flushed in the usual manner the float is allowed to descend with the water for a limited distance; then the movement of the float downwardly is checked by the dashpot mechanism and allowed to descend very slowly, permitting the flush tank to empty and partly fill with water before the float can reach its lowermost position so that the incoming water will pick up the float and carry the same upwardly to bring about closing of the valve element 10 when the tank is full. However, should the usual ball or drain valve of the flush tank fail to close, the float on reaching its lowermost position will automatically close the valve element 10 and cut off the supply of water to the flush tank and thereby prevent waste of water. To restore the device to operation after it has automatically cut off the supply of water the ball or drain valve, of course, is manually seated and the float lifted upwardly and held in this position until sufficient water has entered the flush tank to maintain the float from its lowermost position and thereby allow the tank to fill with water as usual.

It is believed that the foregoing, when taken in connection with the drawings, will fully set forth the construction and advantages of this invention to those skilled in the art to which such a device relates, so that further detailed description will not be required.

Having thus described the invention, what I claim is:

1. In a flush tank valve, an inlet water supply pipe, a valve for controlling said pipe and including a valve lever for operating said valve, a float arm pivotally mounted on said pipe and including spaced extensions to engage with said lever when the float arm is in its uppermost position and in its lowermost position to bring about closing of the water supply pipe by said valve when the float arm occupies either of the stated positions, a float connected to said arm, and a fluid dash pot connected to said float arm and including a valve control means for admitting fluid thereto and permitting said fluid to escape therefrom in accordance with the direction of movement of the float for governing the speed of descent of the float.

2. In a flush tank valve of the character described, an inlet water supply pipe, a valve for controlling said pipe, a bracket mounted on said valve, a valve lever connected to said valve and having one end pivoted on the bracket, a second bracket mounted on the valve and extending above the lever, a float arm pivoted on said second bracket and including an extension to engage the valve lever for closing said valve on the float arm moving into its uppermost position, an enlargement formed on the float arm and spaced from the extension to engage the valve lever for closing said valve on the float arm moving to its lowermost position, a float secured to the float arm, an outlet pipe connected to said valve, and a fluid dashpot mounted on said outlet pipe and connected to said float arm and including a valve means for admitting fluid thereto and permitting its escape therefrom for governing the speed of descent of the float arm.

WALTER H. CRONK.